United States Patent

Ozaku et al.

(10) Patent No.: US 6,467,675 B1
(45) Date of Patent: Oct. 22, 2002

(54) VEHICLE BODY ASSEMBLY APPARATUS AND ASSEMBLY METHOD

(75) Inventors: Hiromi Ozaku, Tokyo (JP); Kousuke Yoshikawa, Kanagawa-ken (JP)

(73) Assignee: Nissan Motor Co., Ltd., Kanagawa (JP)

(*) Notice: Subject to any disclaimer, the term of this patent is extended or adjusted under 35 U.S.C. 154(b) by 68 days.

(21) Appl. No.: 09/631,621

(22) Filed: Aug. 4, 2000

(30) Foreign Application Priority Data

Aug. 6, 1999 (JP) .......................................... 11-224097

(51) Int. Cl.$^7$ .............................. B23K 5/22; B23K 31/02
(52) U.S. Cl. ........................ 228/175; 228/212; 228/213; 228/47.1
(58) Field of Search ........................ 228/212, 32, 47.1, 228/213, 178; 29/429, 200

(56) References Cited

U.S. PATENT DOCUMENTS

| | | | | |
|---|---|---|---|---|
| 4,203,700 A | * | 5/1980 | Seme, Sr. .................... 198/600 |
| 4,441,645 A | * | 4/1984 | Takagishi et la. ............... 24/27 |
| 4,448,341 A | * | 5/1984 | Fujikawa et al. .............. 219/80 |
| 4,667,805 A | * | 5/1987 | Antoszewski .......... 198/341.05 |
| 4,667,866 A | * | 5/1987 | Tobita et al. .................. 219/79 |
| 4,744,500 A | * | 5/1988 | Hatakeyama et al. ........ 228/4.1 |
| 4,767,046 A | * | 8/1988 | Kumagai et al. ............. 228/4.1 |
| 4,905,884 A | * | 3/1990 | Alborante et al. .......... 219/158 |
| 4,946,089 A | * | 8/1990 | Baulier et al. ........... 219/86.24 |
| 4,960,974 A | * | 10/1990 | Shigenaka ............... 219/125.1 |
| 4,972,987 A | * | 11/1990 | Di Rosa ....................... 219/79 |
| 5,010,634 A | * | 4/1991 | Uemura et al. .......... 29/407.04 |
| 5,184,766 A | * | 2/1993 | Takahashi et al. ........... 228/4.1 |
| 5,186,304 A | * | 2/1993 | Kaczmarek et al. ..... 198/346.1 |
| 5,258,598 A | * | 11/1993 | Alborante ................ 219/86.41 |
| 5,265,317 A | * | 11/1993 | Angel ........................ 228/212 |
| 5,267,683 A | * | 12/1993 | Hamada et al. ............... 228/4.1 |
| 5,319,840 A | * | 6/1994 | Yamamoto et al. ........... 29/430 |
| 5,374,799 A | * | 12/1994 | Nishimoto et al. ...... 219/117.1 |
| 5,380,978 A | * | 1/1995 | Pryor ..................... 219/121.64 |
| 5,518,166 A | * | 5/1996 | Numata et al. .............. 228/182 |
| 5,548,096 A | * | 8/1996 | Akasaka et al. ............. 219/108 |
| 5,771,553 A | * | 6/1998 | Sim et al. ................. 29/407.09 |
| 5,811,750 A | * | 9/1998 | Caprioglio .................... 219/81 |
| 6,065,200 A | * | 5/2000 | Negre ...................... 219/86.24 |
| 6,080,961 A | * | 6/2000 | Suzuki .................. 219/121.63 |
| 6,112,390 A | * | 9/2000 | Takeda et al. ......... 219/121.31 |
| 6,138,889 A | * | 10/2000 | Campani et al. ............ 228/177 |
| 6,170,732 B1 | * | 1/2001 | Vogt et al. ................... 219/652 |
| 6,193,142 B1 | * | 2/2001 | Segawa et al. ............. 219/127 |
| 6,250,533 B1 | * | 6/2001 | Otterbein et al. ........... 219/158 |
| 6,344,629 B1 | * | 2/2002 | Kato et al. ................... 218/147 |

FOREIGN PATENT DOCUMENTS

JP 9-216584 8/1997

* cited by examiner

Primary Examiner—M. Alexandra Elve
Assistant Examiner—Colleen P. Cooke
(74) Attorney, Agent, or Firm—McDermott, Will & Emery

(57) ABSTRACT

A front floor panel (31) and a first small component such as a second cross member (35) to be assembled to a surface thereof, with the first small component at the bottom side are positioned and set into a locator jig (29) at a part setting station (S), a moving stage (27) is moved to a welding station (T), and the front floor panel (31) and first small component are welded. A handling robot (55) reverses the front floor panel 31 front-to-rear, the moving stage (27) is caused to retreat to the part setting station (S), and a second small component such as a front floor reinforcement (41) to be assembled to the rear surface of the front floor panel (31) is positioned in locator jig (29), the moving stage (27) being moved to the welding stage and the reversed front floor panel (31) being positioned in a locator jig (29), after which the front floor panel (31) and second small component are welded together.

11 Claims, 15 Drawing Sheets

VEHICLE BODY ASSEMBLY APPARATUS AND ASSEMBLY METHOD

BACKGROUND OF THE INVENTION

The present invention relates to a vehicle body assembly apparatus for and a vehicle body assembly method of mounting relatively small components to front and rear sides of vehicle body parts.

There is disclosed in Japanese Patent Application Laid-Open Publication No. 9-216584 a conventional vehicle body assembly apparatus for mounting small components to front and rear sides of a vehicle body part.

In this vehicle body assembly apparatus, a vehicle body part is forwarded in at one end of an assembly line, the forwarded vehicle body part is held, necessary small components for front and rear sides of the held vehicle body part are grasped by dedicated jigs and positioned to the front and rear sides, the positioned small components are provisionally welded to the vehicle body part by welding guns, and the vehicle body part is forwarded out at the other end of the assembly line.

SUMMARY OF THE INVENTION

Small components to be mounted to front and rear sides of vehicle body parts are different in configuration and location by kinds of vehicles. Therefore, the conventional vehicle body assembly apparatus needs, for every associated kind of vehicle, dedicated positioning jigs for the front sides of respective vehicle body parts and a handling mechanism therefor, and dedicated positioning jigs for the rear sides and a handling mechanism therefor, thus causing a reduced productivity in small quantity production of diverse kinds.

The present invention has been made with such points in view. It therefore is an object of the present invention to provide a vehicle body assembly apparatus and a vehicle body assembly method that allows a maintained productivity even in diverse kind small quantity production.

An aspect of the present invention to achieve the object is a vehicle body assembly apparatus comprising a first mechanism configured to selectively perform a first positioning in which a first set of small components to be mounted to one side of an arbitrary vehicle body part of a plurality of kinds of vehicle body parts are positioned thereto, and a second positioning in which a second set of small components to be mounted to another side of the arbitrary vehicle body part are positioned thereto, and a second mechanism configured to selectively perform a first mounting in which the first set of small components are mounted to the arbitrary vehicle body part, and a second mounting in which the second set of small components are mounted to the arbitrary vehicle body part.

Another aspect of the present invention to achieve the object is a vehicle body assembly method comprising selectively performing a first positioning in which a first set of small components to be mounted to one side of an arbitrary vehicle body part of a plurality of kinds of vehicle body parts are positioned thereto, and a second positioning in which a second set of small components to be mounted to another side of the arbitrary vehicle body part are positioned thereto, and selectively performing a first mounting in which the first set of small components are mounted to the arbitrary vehicle body part, and a second mounting in which the second set of small components are mounted to the arbitrary vehicle body part.

According to another aspect of the present invention, there is provided a vehicle body assembly method for welding small components onto a surface of a vehicle body part, whereby a small component is positioned into a general-purpose jig on a moving stage at a part setting station, the vehicle body part being placed onto the set small component and positioned in another general-purpose jig, after which the moving jig is caused to move to a welding station and the vehicle body part and small component are welded together by a welder, after which the vehicle body part is turned over by a reverser, after which it is transferred to outside from the welding station.

According to another aspect of the present invention, there is provided a vehicle body assembly apparatus having a moving stage that can move between a part setting station and a welding station, a plurality of general-purpose jigs provided on the moving stage which position the vehicle body parts and the small components at the part setting station, a welder for welding together the vehicle body part and small component positioned on the general-purpose jig at the welding station, and a reverse for grabbing and turning over the vehicle body part after welding.

According to another aspect of the present invention, there is provided a vehicle body assembly method for welding a small components onto the front and rear surfaces of a vehicle body part, whereby a first small component to be assembled to a first surface of the vehicle body part is positioned into a general-purpose jig on a moving stage at a part setting station, the vehicle body part being placed onto the set small component positioned in another general-purpose jig, after which the moving stage is caused to move to a welding station and the vehicle body part and small component are welding together, after which the vehicle body part is turned over by a reverser and the moving stage is caused to retreat to the part setting station, a second small component being positioned into the general-purpose jig on the moving stage, after which this moving stage is again caused to move to the welding station, at which the turned-over vehicle body part is placed onto the second small component and positioned into another general-purpose jig on the moving stage, and the welder welds the vehicle body part and the small component together, after which they are transferred to outside from the welding station.

BRIEF DESCRIPTIONS OF THE DRAWINGS

The above and other objects, features and effects of the present invention will be apparent from the description of embodiments to follow, when the same is read in conjunction with the accompanying drawings, in which.

DETAILED DESCRIPTION OF THE PREFERRED EMBODIMENTS

There will be described below a vehicle body assembly apparatus and a vehicle body assembly method according to an embodiment of the present invention, with reference to the accompanying drawings.

The vehicle body assembly apparatus and vehicle body assembly method according to the embodiment is installed in or applicable to a line of a production plant adapted, without line changes, for assembly of "a vehicle body of an arbitrary kind of vehicle of a plurality of specified kinds of vehicles" (hereafter collectively referred to "VB") having a total of I vehicle body parts BSi (i=1 to I), and serves for mounting, by use of servo welding guns, necessary small components to a front side and a rear side of "an arbitrary one of J (J<I or J=I) vehicle body parts BSj designated in advance out of the I vehicle body parts" (hereafter sometimes collectively called "workpiece" and referred to "W").

Figure 17:
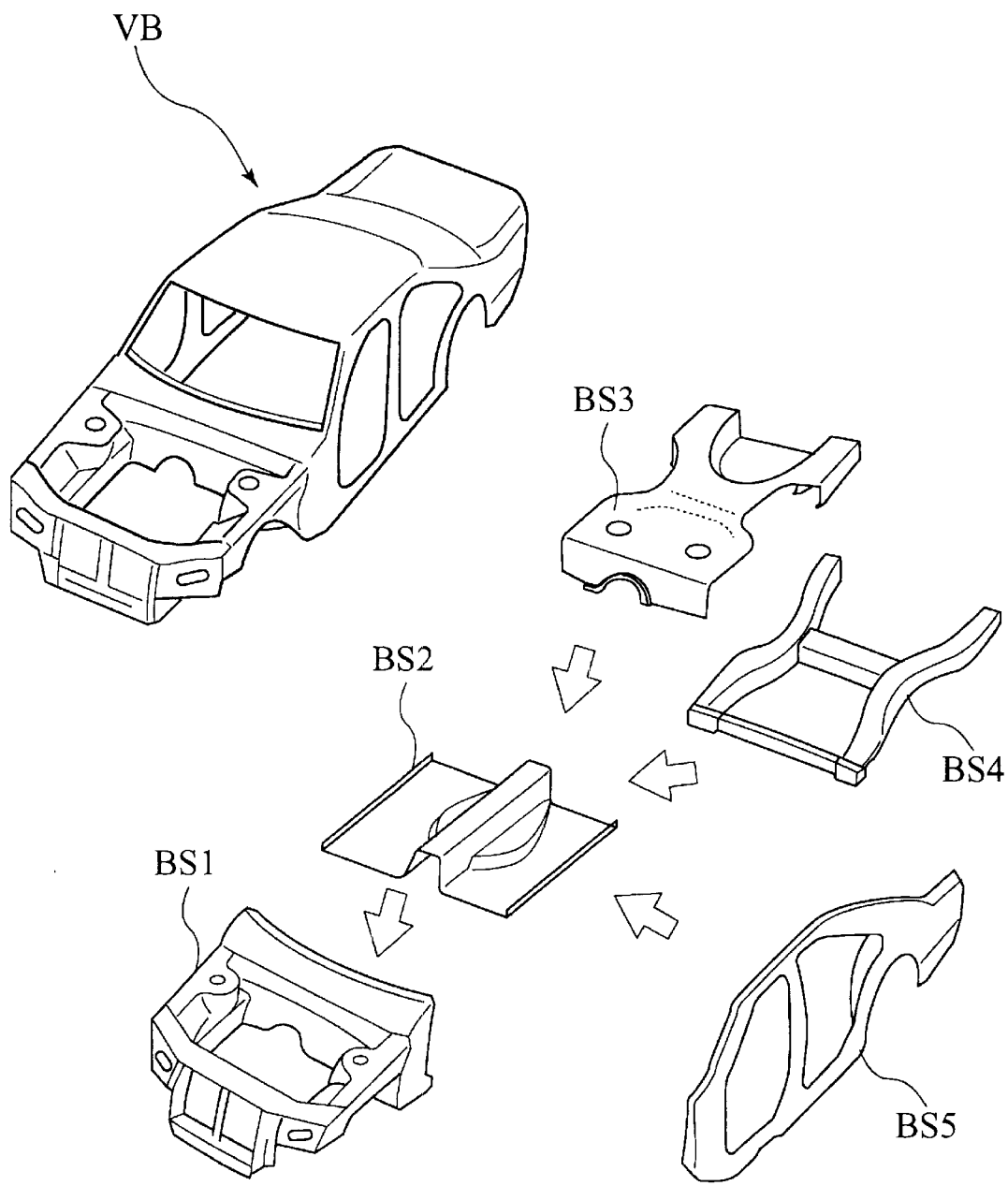
FIG. 17 is an illustration showing exemplary vehicle body parts to which the present invention is applicable.

A comprehensive image of a vehicle body VB and its parts BSi are illustrated in FIG. 17. As is apparent from FIG. 17, the vehicle body VB is made up by assembling six vehicle body parts BSi (i=1 to 6), that is, an engine compartment (as a front body) BS1, a front floor (or middle floor) panel BS2, a rear floor panel BS3, a rear floor member BS4, a left side body BS5, and a right side body BS6 (substantially symmetrical to the left side body BS5, and omitted from FIG. 17).

Among the six vehicle body parts BSi (i=1 to 6), the front floor panel BS2 and the rear floor panel BS3, which are each made up as a so-called single sheet member, each have respective pluralities of small components to be mounted on its front side (or upside of the floor) and rear side (or downside of the floor), and are designated as a workpiece W to be fabricated at the above-noted assembly apparatus by the above-noted assembly method, and to be registered together with corresponding small components in an NC (numerical control) controller of the apparatus. For example, there may be registered reinforcements for transformer/controller, brackets for seat mountings, etc. as small components for the front side of the front floor panel BS2, and brackets for center bearing mountings, extension side members, etc. as small components for the rear side of the front floor panel BS2. As small components for the rear floor panel BS3, there may be registered members for rear seat cross upper, brackets for spare wheel clamps, etc for the front side, and reinforcements for seatbelt anchors, brackets for muffler mountings, etc. for the rear side.

Of the two vehicle body parts BSj (j=2, 3), the front floor panel BS2 is relatively soft and low of rigidity, allowing for the present invention to have significant effects implemented, and the following description will be made of a particular kind of front floor panel 31 as a workpiece W to be represented by the vehicle body part BSj (j=2).

Any of the remaining vehicle body parts BSi (i=1, 4–6) may be designated as a workpiece W. For example, the engine compartment BS1 and the rear floor member BS4 may well be designated.

Figure 1:
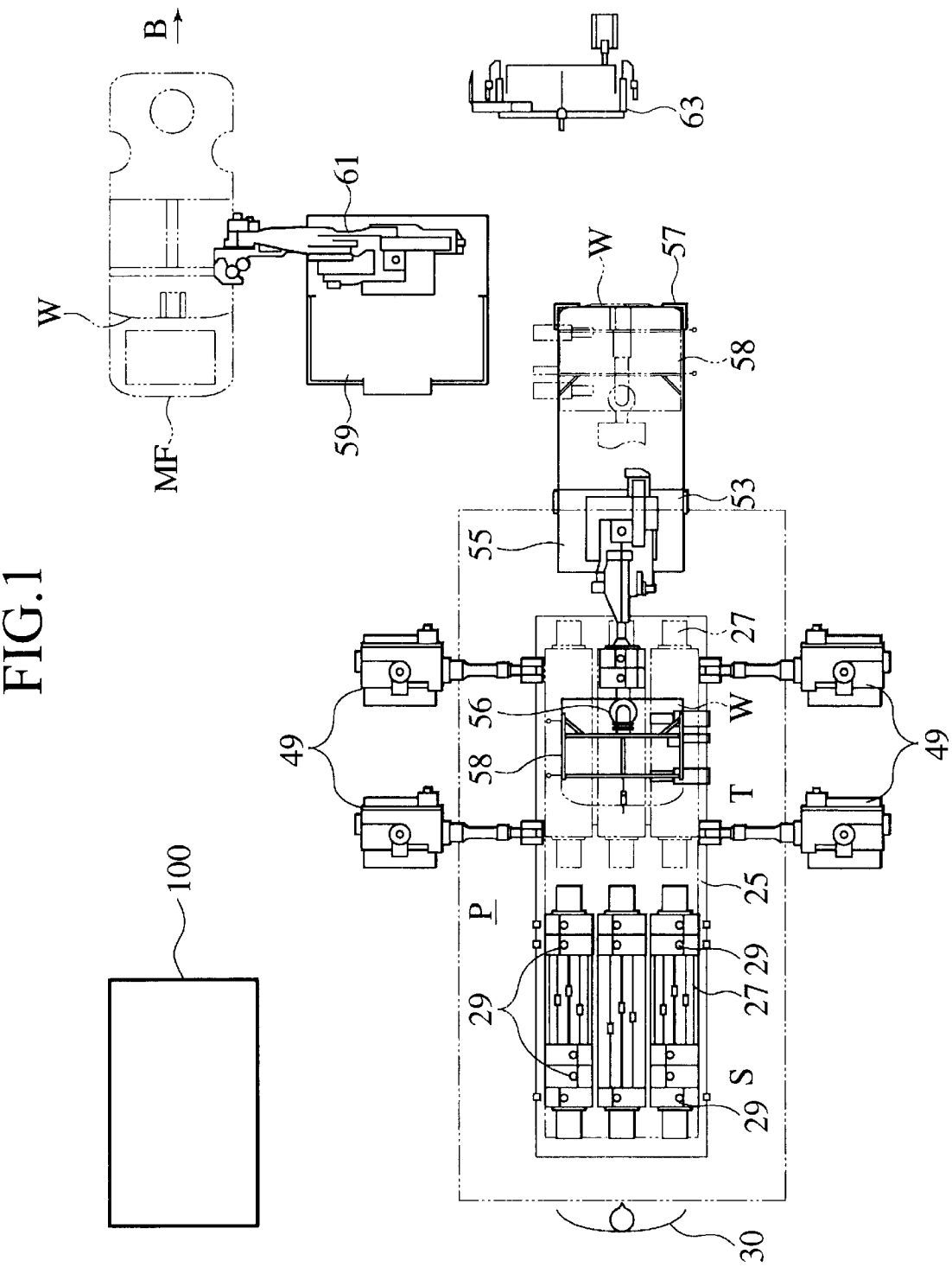
FIG. 1 is a plan view of a vehicle body assembly apparatus according to an embodiment of the present invention.
Figure 2:
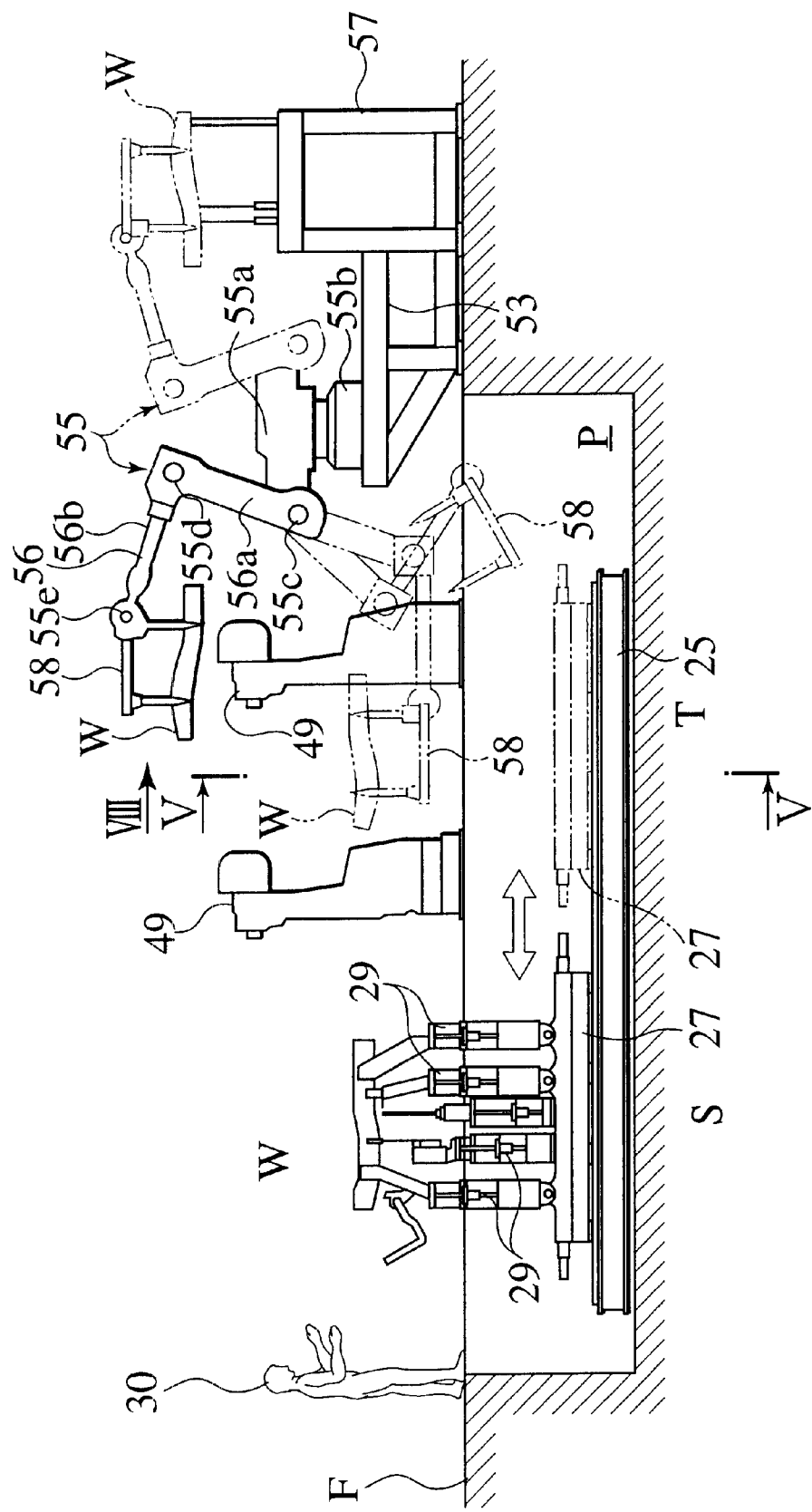
FIG. 2 is a front cross-sectional view of the vehicle body assembly apparatus of FIG. 1.

FIG. 1 is a plan view showing the overall configuration of a vehicle body assembly apparatus according to an embodiment of the present invention, and FIG. 2 is a front cross-sectional view thereof, from which part of the apparatus has been omitted. In FIG. 1, defined by reference numeral 100 is a console provided with an NC controller for governing an entirety of the apparatus.

This vehicle body assembly apparatus has a jig sliding apparatus 25 within a pit P provided by cutting out the floor surface F, a moving stage 27 on this sliding apparatus 25 being provided so as to be movable between a part setting station S, indicated by a solid-line in FIG. 2, and a welding station T, indicated by a double-dot-dashed line in FIG. 2.

On the moving stage 27 are provided a plurality of locator jigs 29 as general-purpose jigs for positioning and holding a workpiece W. An operator 30 sets a workpiece W onto the part setting station S on the locator jig 29, and performs a welding operation on the set workpiece W at the welding station T.

Figure 3:
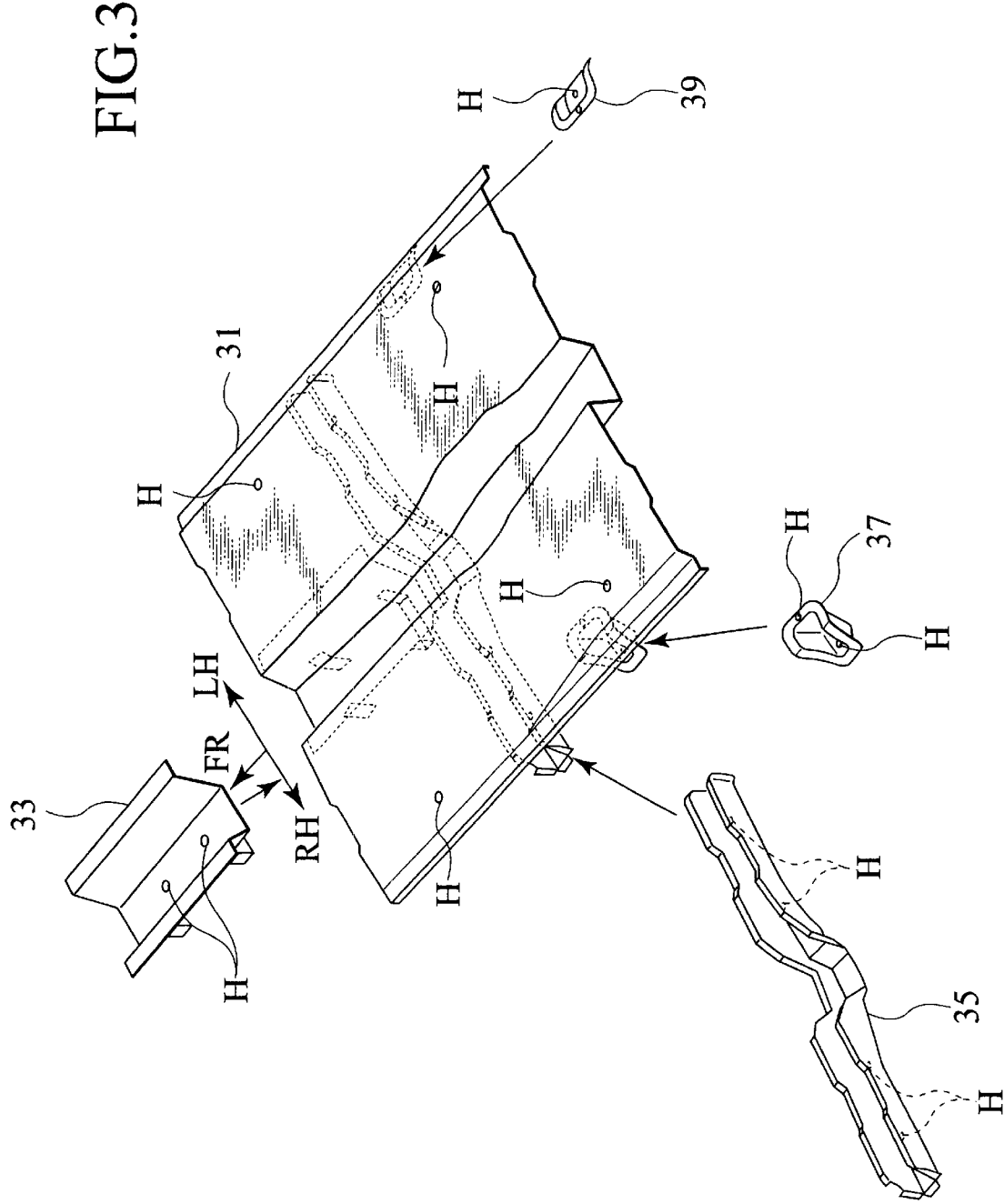
FIG. 3 is a perspective view of a vehicle body part and small components to be assembled to a front surface thereof by welding at the vehicle body assembly apparatus of FIG. 1.
Figure 4:
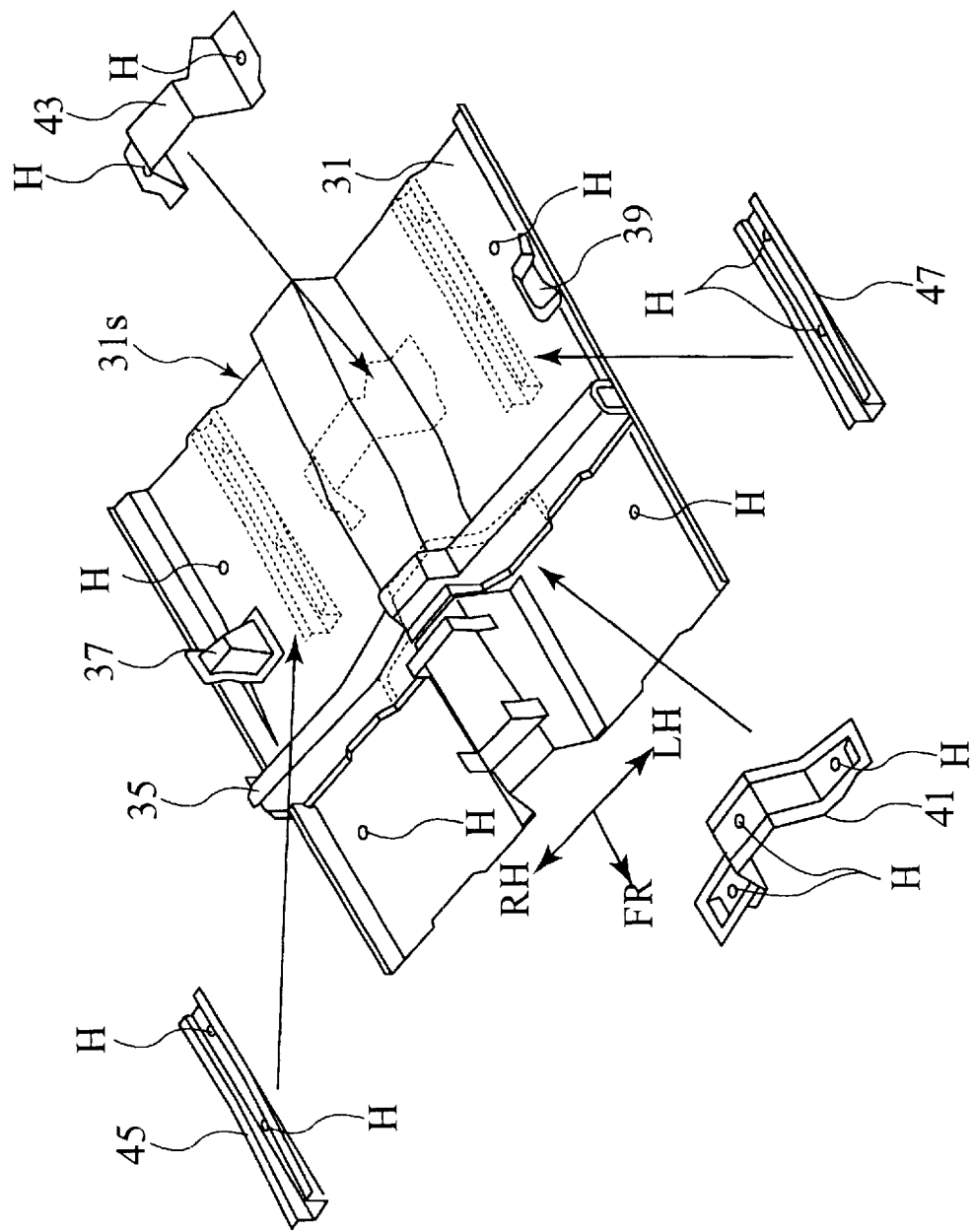
FIG. 4 is a perspective view of the vehicle body part and small components to be assembled to a rear surface thereof by welding at the vehicle body assembly apparatus of FIG. 1.

The workpieces W, as shown in FIG. 3 and FIG. 4, are a front floor panel 31 in a vehicle body, a various first small components to be welded to the front surface (floor top surface), these being a transverse controller reinforcement 33, a second crossmember 35, a front seat mounting outer piece RH 37 and front seat mounting outer piece LH 39, and second small components to be welded to the rear surface (floor bottom surface), these being a front flooring reinforcement 41, a parking brake reinforcement 43, an extension side member RH 45 and an extension side member LH 47.

In FIG. 3 and FIG. 4, the vertical positioning relationship of the workpiece W is shown set into the locator jig 29. Thus, in FIG. 3, the first small components 33, 35, 37, and 39 are set into the locator jig 29, after which the front floor panel 31 is placed thereover, and positioned in another locator jig 29. In FIG. 4, the second small components 41, 43, 45, and 47 are positioned in the locator jig 29, after which the front floor panel 31 to which are welded the first small components 33, 35, 37, and 39, that is, the front floor panel sub-assembly 31s, is placed thereonto and set into the locator jig 29. In FIG. 3 and FIG. 4, the vehicle front direction is indicated by FR, the vehicle left side with respect to the front direction is indicated by LH, and the vehicle right side with respect to the front direction is indicated by RH.

That is, the front floor panel 31 is turned over front-to-rear between the time that the first small components 33, 35, 37, and 39 are assembled thereonto and the time that the second small components 41, 43, 45, and 47 are assembled thereonto, the condition shown in FIG. 4 being the attitude in which it is actually assembled into the vehicle body.

The left and right side directions of movement of the moving stage 25 at the welding station T have four welding robots 49 provided as welders. The welding robots 49 perform welding between the front floor panel 31 and the first small components 33, 35, 37, and 39, and welding of the front floor panel sub-assembly 31s shown in FIG. 4 to the second small components 41, 43, 45, and 47.

Figure 5:
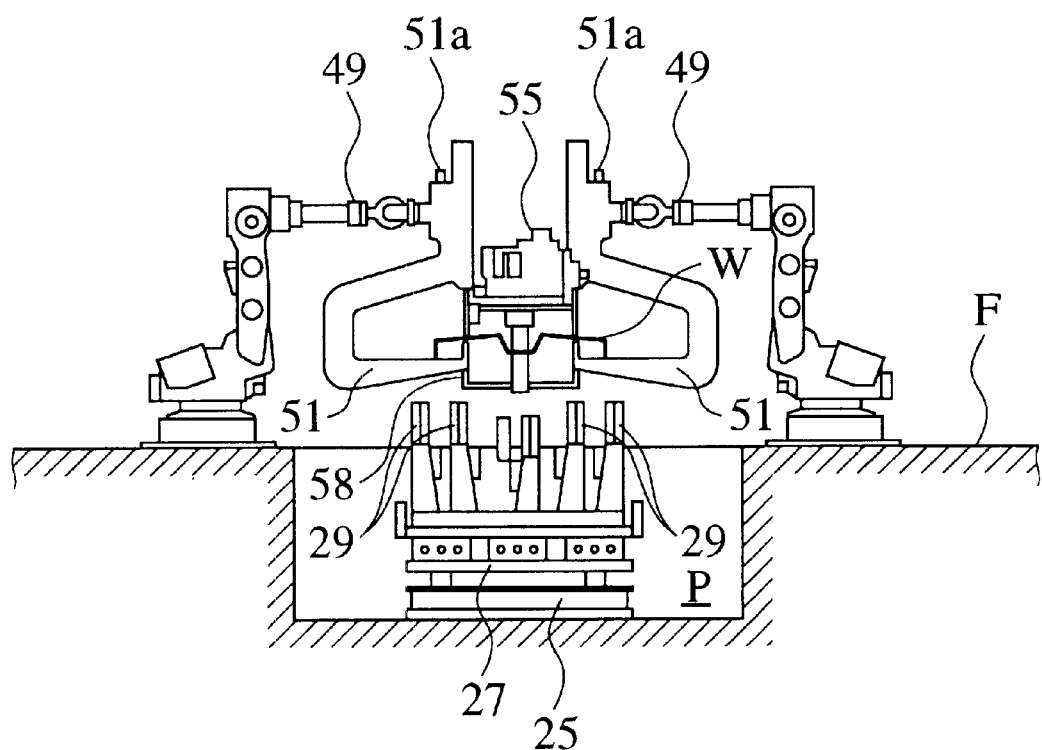
FIG. 5 is a cross-sectional view along line V—V of FIG. 2.

FIG. 5 is a cross-sectional view along line V—V of FIG. 2. The welding robots 49 each have a welding gun 51, in which the distance of a movable electrode relative to a stationary electrode is controllable by a servo feed mechanism 51a. The workpiece W (front floor panel 31) is appropriately grabbed and held between the electrodes of the welding guns 51 of the welding robots 49, and the locator jig 29 accepts the workpiece W that is lowered.

In FIG. 1 and FIG. 2, a handling robot 55 is disposed as a reverser installed on a robot supporting stage 53 on the floor surface F to the right side of the welding station T. The handling robot 55, with the workpiece W grabbed-and-held up as shown in FIG. 5 by the four welding robots 49, causes a grabbing mechanism 58 at the end of the robot hand 56 to advance below the workpiece W and to grab and turn the workpiece over front-to-rear.

The handling robot 55 has a main part 55a that can rotate within a horizontal plane with respect to a base part 55b thereof, the main part 55a and a first hand part 56a of the robot hand 56 being rotatable about a rotating support 55c, the first hand part 56a and the second hand part 56b being rotatable about the rotating support 55d, and the second hand part 56b and grabbing mechanism 58 being rotatable about the rotating support 55e, these rotational movements being within the plane of the drawing in the condition shown in FIG. 2. The second hand part 56b can rotate about the second hand part 56b as a center with respect to the first hand part 56a. That is, the grabbing mechanism 58 at the end of the second hand part 56b also rotates integrally, so that the workpiece W is reversed front-to-rear.

A workpiece placement stage 57 is installed further to the right of the robot supporting stage 53, and when all the welding work has been completed with respect to the workpiece W by the welding robot 49, the workpiece W is transferred to the workpiece placement stage 57 by the handling robot 55.

As shown in FIG. 1, a transfer robot 61 is installed on the robot supporting stage 59, to the left side of the workpiece placement stage 57 from the welding station T. A main assembly line B is along which a main floor panel MF to which the workpiece W is welded is provided to the left side of and adjacent to the transfer robot 61.

A stud bolt welder 63 is installed in the workpiece transport forward direction as noted above, this stud bolt welder 63 welding a stud bolt to the workpiece W grabbed on the workpiece placement stage 57. After the welding of the stud bolt, the transfer robot 61 retains its grip on the workpiece W as it causes the robot hand to turn and transfers the workpiece to the main floor panel on the main assembly line B.

Figure 6:
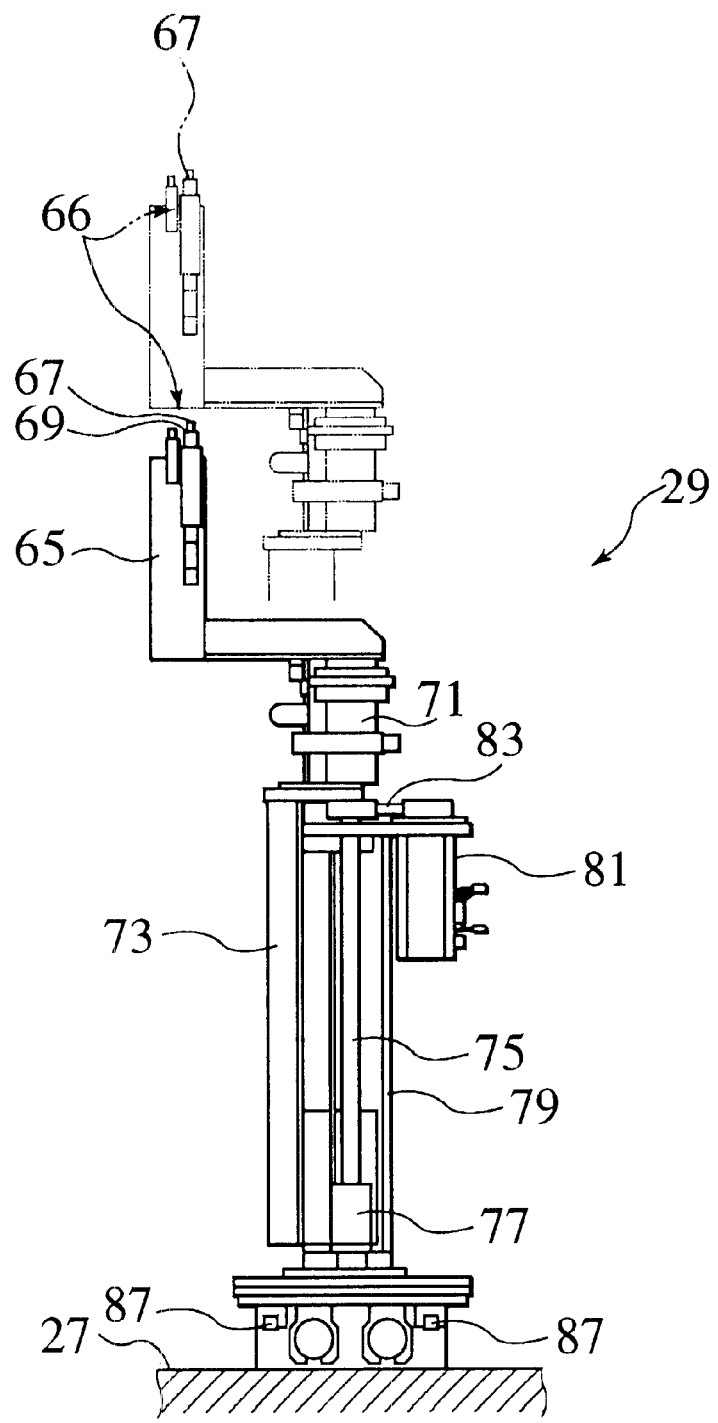
FIG. 6 is a front view of a locator jig installed on a moving stage of the vehicle body assembly apparatus of FIG. 1.

FIG. 6 shows an example of a locator jig 29 installed on the moving stage 27. The locator jig 29 is provided with a positioning/holding mechanism 66 on an upper end of a bracket 65 at an upper part thereof. The positioning/holding mechanism 66 has a positioning pin 67, the positioning pin 67 being inserted in an appropriately formed positioning hole H in the workpiece as shown in FIG. 3 and FIG. 4, and has an internal retractable clamping tongue (not shown in the drawing) therewithin.

That is, by inserting the positioning pin 67 into the positioning hole H of the workpiece W from the bottom, the step 69 on the bottom part thereof comes into contact with and presses up against the lower surface of the workpiece, and in this condition the clamp rotates so as to protrude to the outside from a slit formed in the positioning pin 67, thereby pressing up against the workpiece from the top. By this action, the workpiece W is positioned by the positioning pin 67, and held between the step 69 and the clamp tongue.

The lower end of the bracket 65 is fixed to the upper end of the frame 73 via a rotating support drive part 71, the lower end of the frame 73 being fixed by means of a nut 77 that is screwed onto a ball screw 75 extending up and down. The frame 73 is guided up and down by a jig main part 79, a motor 81 being mounted to an upper part of the jig main part 79. The rotation of the motor 81 is transmitted to the ball screw 75 via a motive force linking mechanism 83, formed by a pulley and a belt.

That is, the ball screw 75 rotates by the drive from the motor 81, so that the nut screwed thereto moves up and down, causing the frame 73 that is integral with the nut 77, the rotating support drive part 71, the bracket 65, and the positioning pin 67 to move up and down. The bracket 65 having the positioning pin 67 on its upper part can rotate in the plane that is perpendicular to the plane of the drawing by means of the rotating support drive part 71, this rotational movement and the up and down movement making it possible to set the positioning pin 67 to suit the positioning holes H of a variety of types of workpieces.

Figure 7:
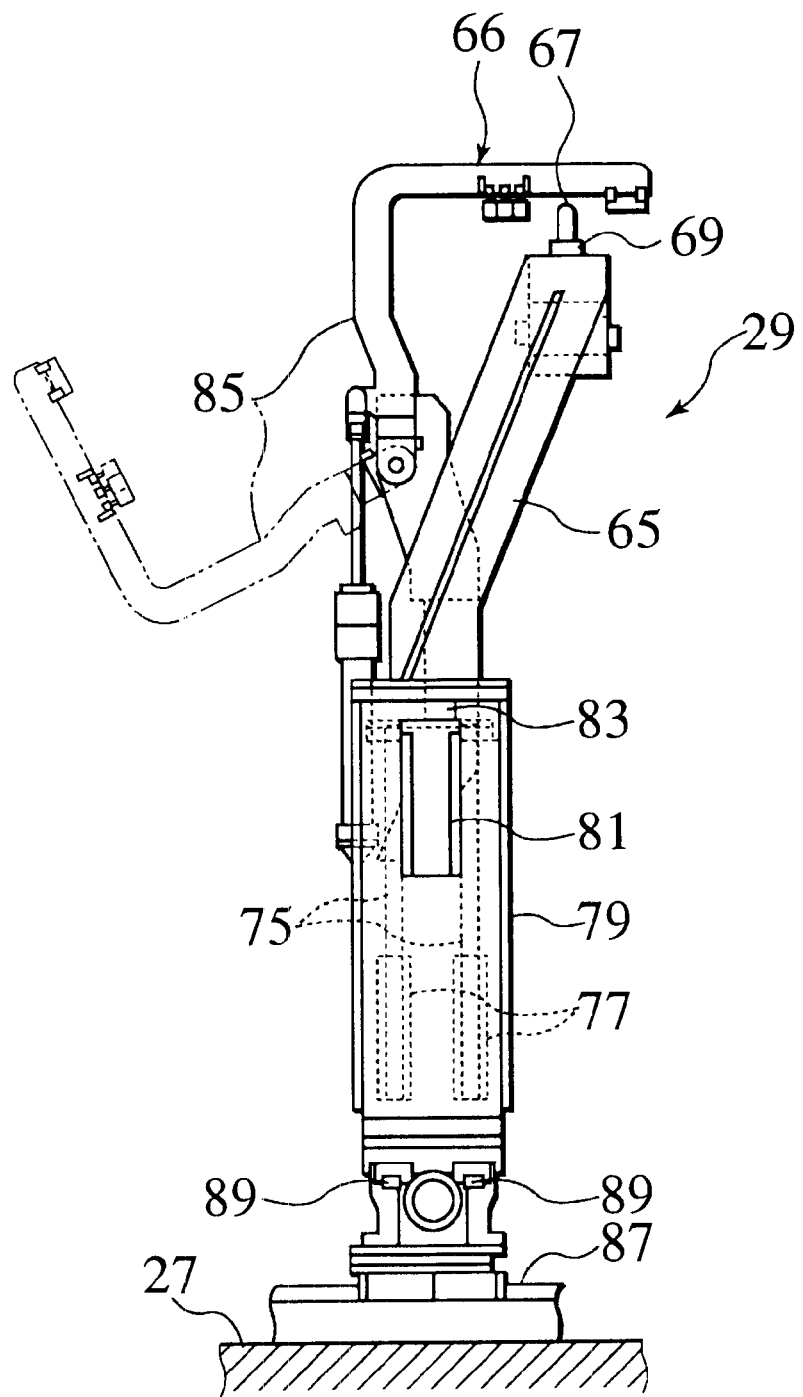
FIG. 7 is a front view of another locator jig installed on the moving stage of the vehicle body assembly apparatus of FIG. 1.

FIG. 7 shows another example of a locator jig 29. This locator jig 29, with the exception of a rotating support drive part 71, has substantially the same configuration as shown in FIG. 6, and has an added clamp arm 85 that presses onto the workpiece W from the top so as to hold the workpiece W. Other constituent elements corresponding to FIG. 6 are assigned the same reference numerals.

In addition to the examples shown in FIG. 6 and FIG. 7 a variety of types of locator jigs 29 can be envisioned. For example, in FIG. 6 it is possible to provide to sets of the components at the top part of the rotating support drive part 71, with a single locator jig 29 being capable of performing positioning at two locations.

In FIG. 6, a direction perpendicular to the plane of the drawing is the direction of movement of the moving stage 27, and in FIG. 7, the left-to-right direction is the direction of movement of the moving stage 27. On this moving stage 27, a locator jig 29 as shown in FIG. 6, is guided by a guide rails 87 installed so as to extend in a direction that is perpendicular to the plane of the drawing, and can move in a direction that is the same as the movement direction of the moving stage 27, the locator jig 29 of FIG. 7, in addition to the movement along the guide rails 87, can move along guide rails 89 that are disposed so as to extend in a direction that is perpendicular to the guide rails 87 (a direction that is perpendicular to the plane of the drawing of FIG. 7).

The motor 81 and ball screw 75 or the like can be used as a drive mechanism to control these movements. By the two-direction movement of the locator 29 itself the positioning by the positioning pin 67 can be done so as to accommodate a wider variety of workpieces W. That is, it is possible to achieve a more universally usable locator jig 29

Figure 8:
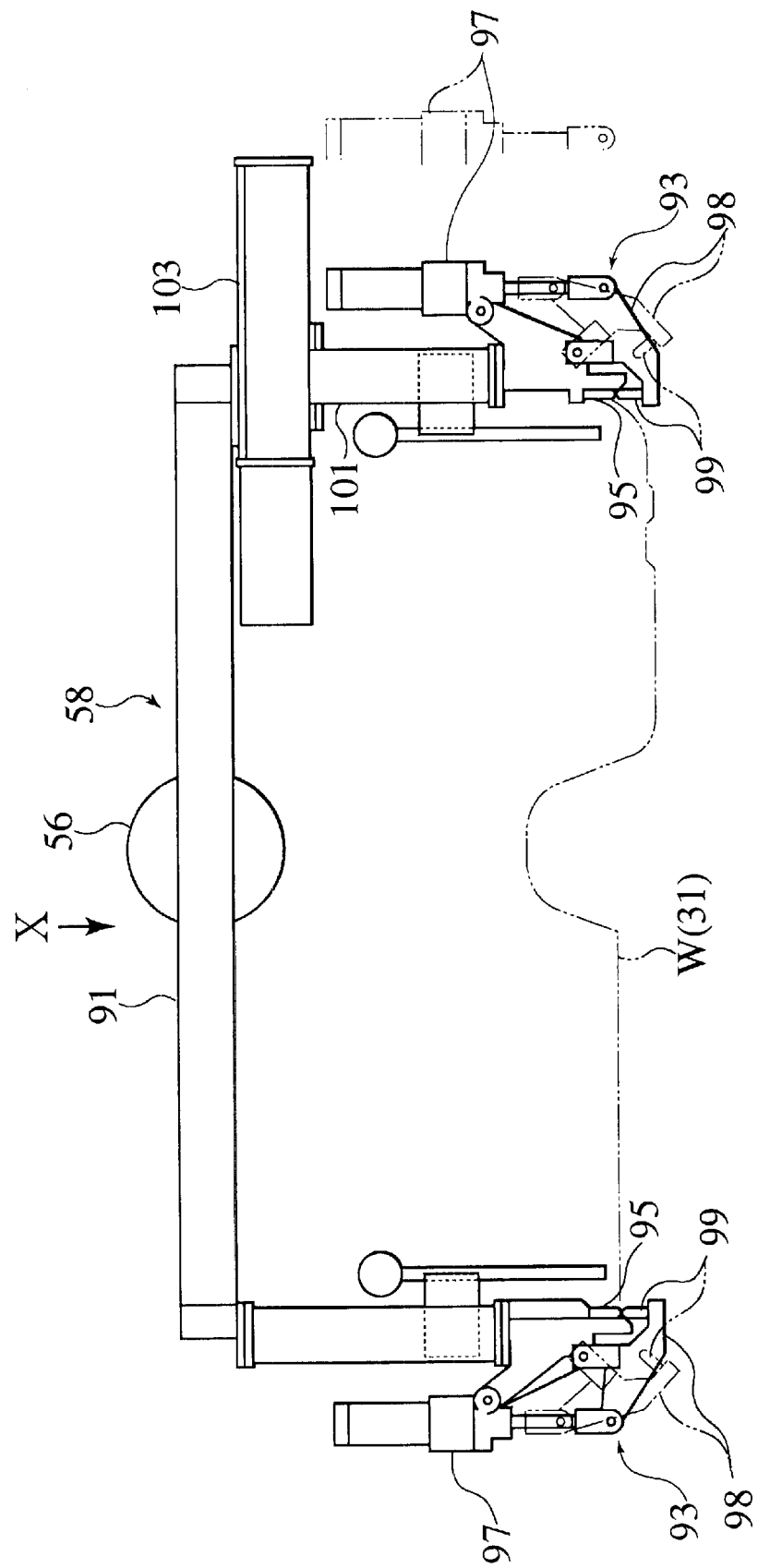
FIG. 8 is a detail at arrow VIII of FIG. 2.

FIG. 8 shows a grabbing mechanism for grabbing the workpiece in the handling robot 55, as seen from the direction indicated as C in FIG. 2. A clamping mechanism 93 is provided on the lower four corners of the frame 91 of the grabbing mechanism 58. The clamping mechanism 93 has a fixed clamp pin 95 and a movable clamp pin 99 that moves between the position indicated by the solid line and the position indicated by the double-dot-dashed line, via a bracket 99 by means of a cylinder 97, and when the movable clamp 99 is at the position indicated by the solid line, the four corners of the workpiece W (front floor panel 31) are clamped from both the front and the rear surfaces.

The two clamping mechanisms 93 disposed along a direction that is perpendicular to the drawing plane of FIG. 8 on the right side can move to the left and right as shown in the drawing, along guide rails 103 provided on a frame 91, via a bracket 101 to which are mounted the fixed and movable clamp pins 95 and 99, and the cylinder 97. This movement occurs because of a drive mechanism formed, for example, by a cylinder mounted to the frame 91, the range of movement corresponding to the range indicated by the range of the cylinder 97 shown by a solid line and a double-dot-dashed line. The movement of the clamping mechanism 93 enables the grabbing of a variety of workpieces W.

A grabbing mechanism 58 such as shown in FIG. 8 is provided on the transfer robot 61 as well, which transfers the workpiece W to the main assembly line B. In this case, however, the robot hand end of the transfer robot 61 is linked to the upper center part of the frame 91 as shown in FIG. 8.

Figure 9:
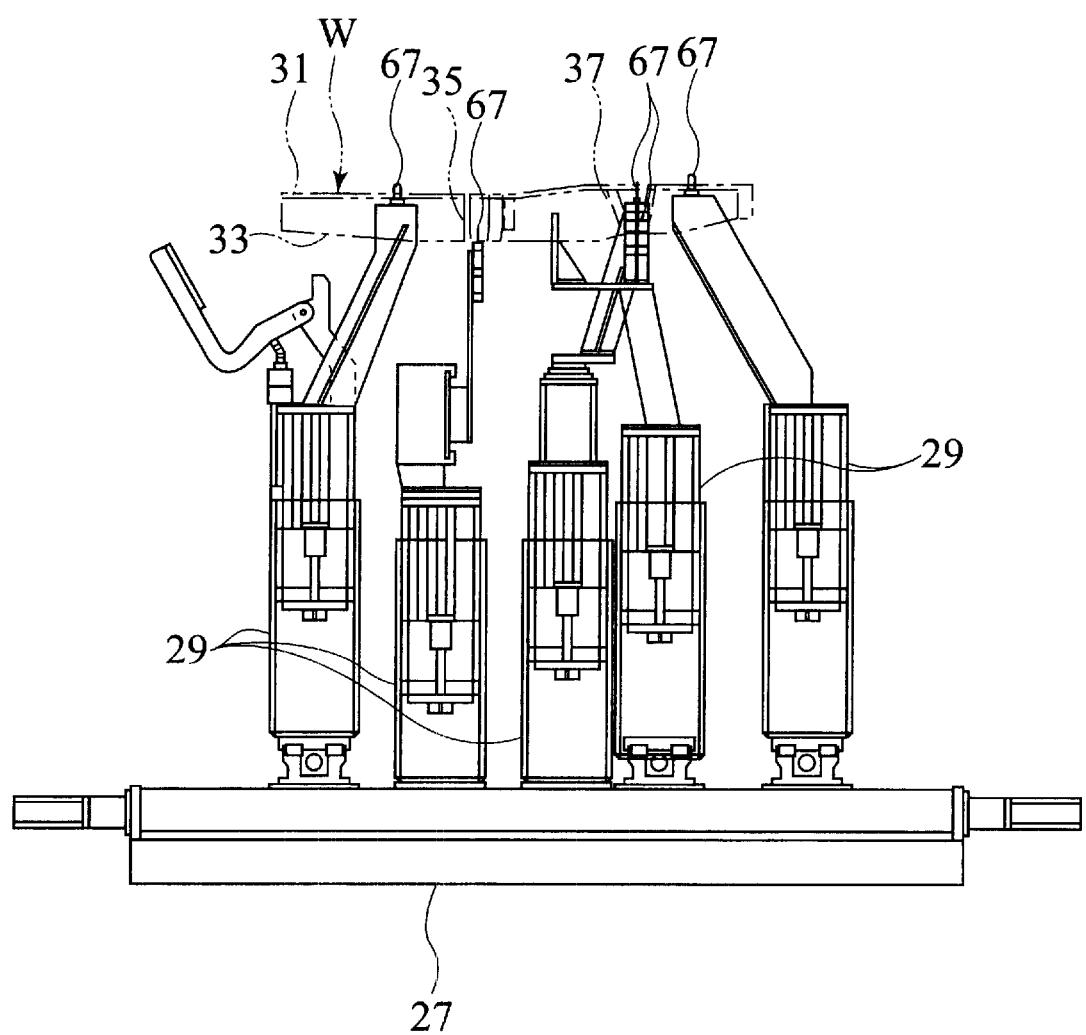
FIG. 9 is a front view of locator jigs of FIGS. 6 and 7 having the front floor panel and small components of FIG. 3 set thereto.
Figure 10:
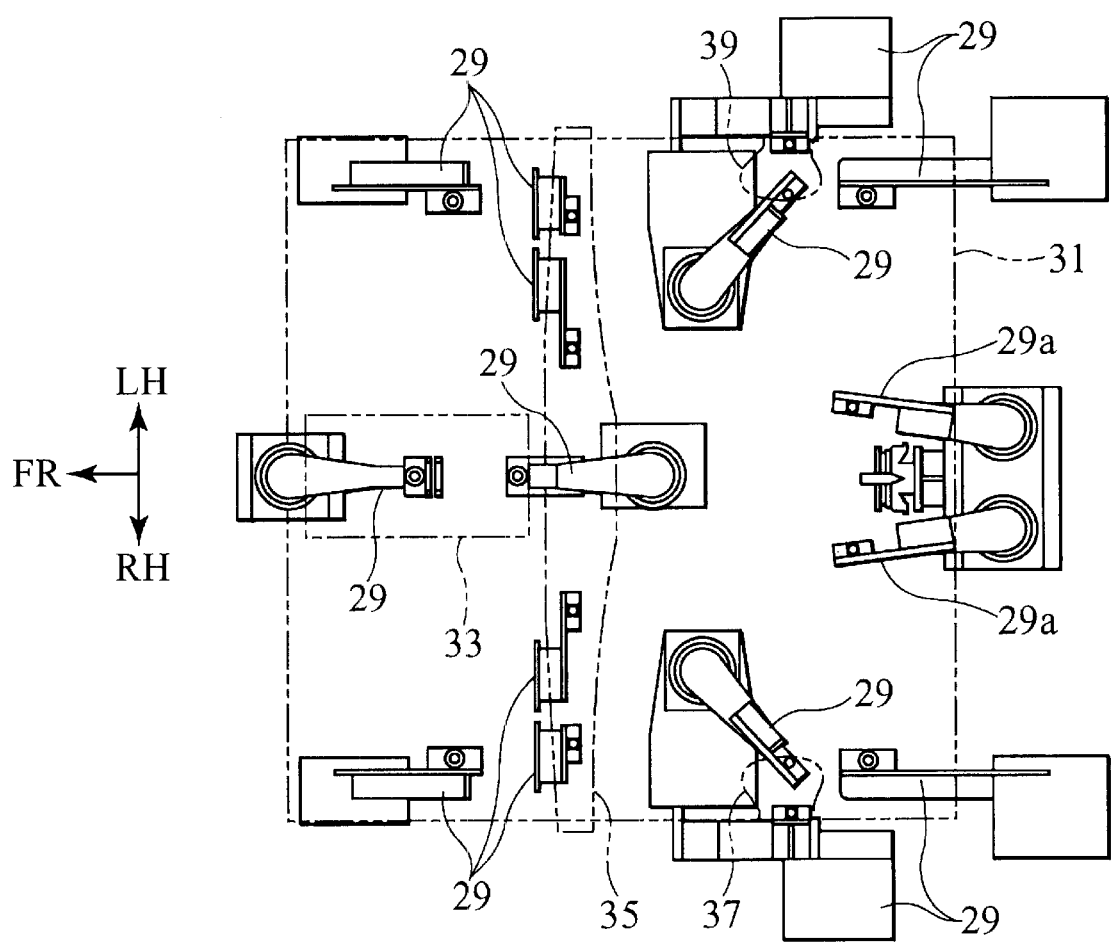
FIG. 10 is a view along arrow X of FIG. 8.

The operation of this vehicle body assembly apparatus is as follows. First, as shown in FIG. 2, with the moving stage 27 at the part setting station S, an operator 30 sets the first small components 33, 35, 37, and 38 into each corresponding locator jig 29, and the front floor panel 31 is placed thereover and set into another corresponding locator jig 29. This condition is shown in enlarged form in FIG. 9. FIG. 10 is a plan view corresponding to FIG. 9. Then, using the positioning mechanisms 66 of each locator jig 29, the first small components 33, 35, 37, and 39 and the front floor panel 31 are positioned and held in place.

When this is done, not all of the locator jigs 29 are used, the jigs used depending upon the type of vehicle, and surplus locator jigs 29 that are not used for positioning are used, for example, as shown in FIG. 11 through FIG. 14. The locator jig 29 here is indicated as a locator jig 29a that is not needed for positioning.

Figure 11:
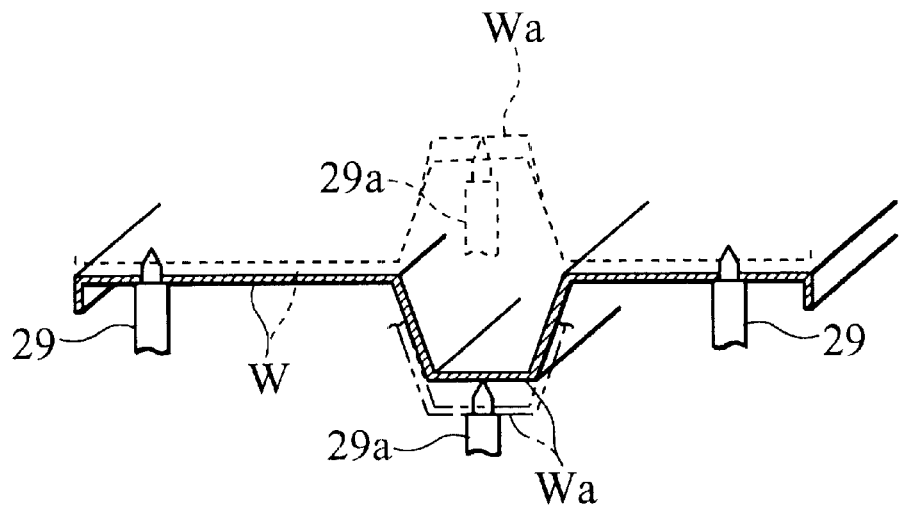
FIG. 11 is an illustration showing a surplus locator jig not used in positioning and employed to prevent sag of a workpiece.

FIG. 11 shows a condition in which a workpiece W is positioned and held by locator jigs 29 positioned on the left and right sides thereof, the end of a positioning pin 67 of a center locator jig 29a supporting either a downward protrusion (indicated by solid lines) of the workpiece W or an upward protrusion (indicated by broken lines) Wa of the workpiece W, so as to prevent sagging thereof at that location. In FIG. 10, as a locator 29 to prevent sagging, there are the two locator jigs 29a supporting the lower surface of the vehicle body rear side (right side in FIG. 10) of the front floor panel 31.

Figure 12:
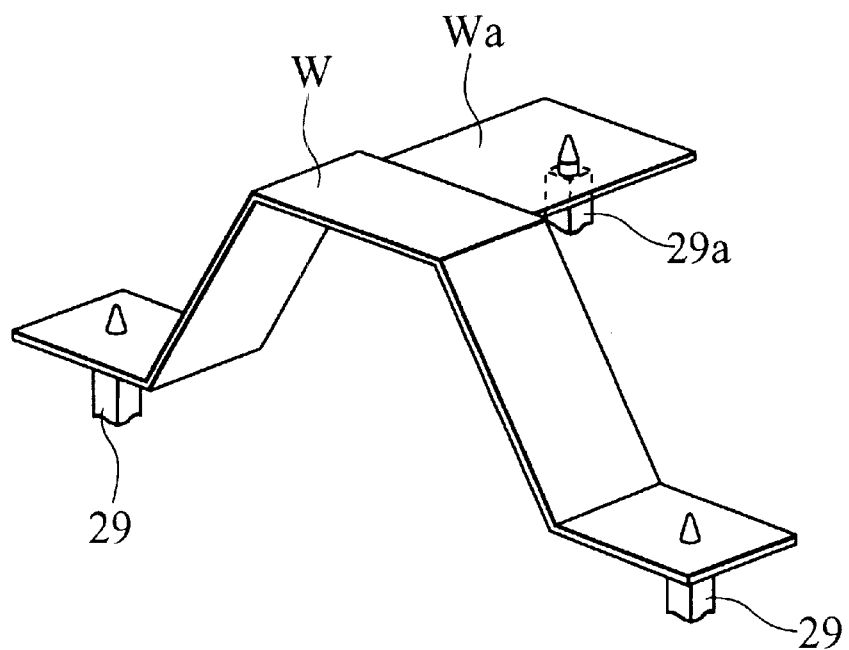
FIG. 12 is an illustration showing a surplus locator jig not used in positioning and employed to prevent falling over of a workpiece.

FIG. 12 shows a condition in which a sideward protrusion Wa of a workpiece W supported positioned by two locator jigs 29 is supported from the bottom by a surplus locator jig 29a that is not used for positioning, thereby preventing falling over of the workpiece W.

Figure 13:
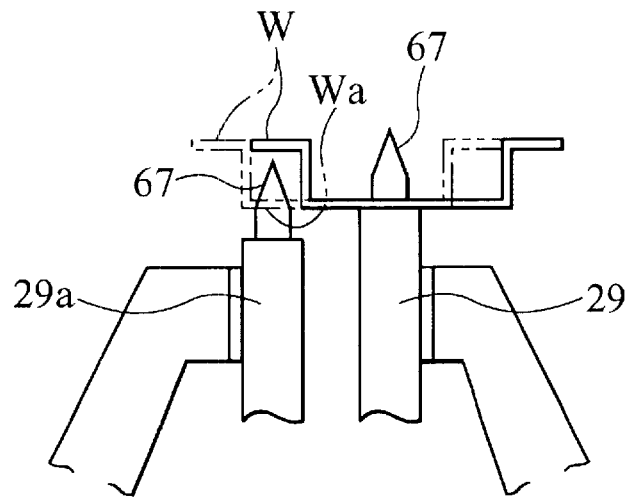
FIG. 13 is an illustration showing a surplus locator jig not used in positioning and employed to prevent improper setting of a workpiece.

FIG. 13 shows a condition in which a surplus locator jig 29a not used for positioning and adjacent to a locator jig 29 used for positioning of the workpiece W is used for preventing improper setting of the workpiece W. Here, the solid lines show the workpiece W properly set, and the double-dot-dashed line shows the workpiece W reversed left-to-right with respect to the properly setting attitude. In the improper setting condition, the positioning pin 67 of the locator jig 29a makes contact with the downwardly protruding part Wa of the workpiece W, thereby enabling distinguishing of the improperly set condition.

Figure 14:
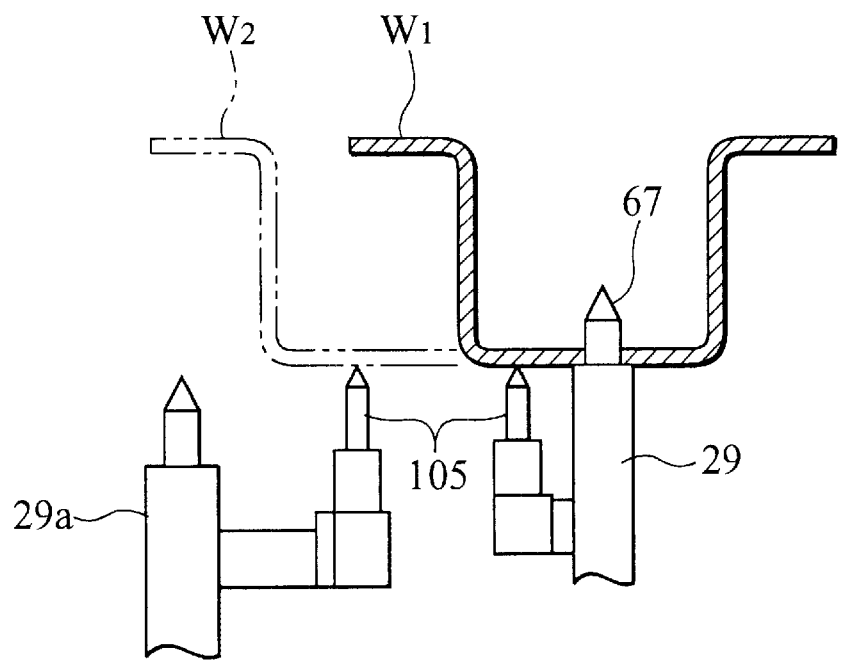
FIG. 14 is an illustration showing a workpiece detector of a surplus locator not used for positioning and employed to detect a workpiece set in proximity thereto.

FIG. 14 shows a condition in which a workpiece detector 105 of a surplus locator jig 29a not used for positioning and which is adjacent to a locator jig 29 using for positioning of the workpiece W is used to detect the workpiece W. For example, with respect to a workpiece W1 of a vehicle type A, the workpiece detector 105 of the locator jig 29 itself performs workpiece detection, and with respect to a workpiece W2 of a vehicle type B, in addition to the workpiece detector 105 of the locator jig 29, the workpiece detector 105 of the locator jig 29a also performs workpiece detection, thereby enabling distinguishing of the type of vehicle.

This workpiece detector 105 is provided on all of the locator jigs 29, although this is not illustrated in FIG. 6 and FIG. 7.

Thus, as shown in FIG. 11 through FIG. 13, depending on the type of vehicle, it is possible to efficiently use a surplus locator jig 29a not used for positioning, so that, as shown in the example of FIG. 14, by using a workpiece detector 105 of an adjacent locator jig 29, it is possible to accommodate a case in which there is a restriction with regard to the method of detecting the workpiece W or the detection position.

At the part setting station S, if the first small components 33, 35, 37, and 39 and the front floor panel 31 are positioned and held to the locator jig 29, the moving stage 27 is caused to move from the part setting station S to the welding station T. At the welding station, four welding robots 49 perform temporary welding of the first small components 33, 35, 37, and 39 to the front floor panel 31 so as to assemble the components thereto.

When the temporary welding work is completed, the welding guns 51 of the four welding robots 49, as shown in FIG. 5, grab the four corners of the workpiece W (front floor panel 31), so as to hold the workpiece W, the positioning and holding of which by the positioning mechanism 66 of the locator jig 29 was released, the locator jig 29 being lowered and caused to move away. In this condition, the grabbing mechanism 58 of the handling robot 55 being caused to advance below the workpiece W with the with the clamping mechanism 93 shown in FIG. 8 in the upward facing condition indicated by the double-dot-dashed line in FIG. 2 (opposite top-to-bottom with respect to FIG. 8), the four clamping mechanisms 93 clamping and holding the four corners of the workpiece W at positions that do not interfere with the welding guns 51.

When the workpiece W is held by the handling robot 55, after the release of the grabbing of the workpiece W by the welding robots 49, the handling robot 55, as shown by the solid line of FIG. 2, moves the workpiece W upward, after which it reverses it top-and-bottom so as to reverse the front and rear sides thereof. That is, although the first small components 33, 35, 37, and 39 were positioned on the lower surface of the front floor panel 31 at the time of temporary welding, the reversal means that they are then positioned on the upper surface of the front floor panel 31.

During the holding and reversal of the workpiece W by the handling robot 55 after the grabbing of the workpiece W by the welding robots 49, the moving stage 27 returns from the welding station T to the part setting station S, at which point the second small components 41, 43, 45, and 47 are positioned in the corresponding locator jigs 29.

Because the task of reversing the above-noted workpiece W without using a special reversing apparatus, or providing a special reversing station, the work efficiency is improved and the space required for work is reduced. Because the workpiece W is grabbed by the welding robots 49 before it is reversed, it is not necessary to have a special dedicated grabbing mechanism, thereby resulting in an accompanying reduction in equipment cost, the sufficient establishment of welding space, and a improvement in the ease of welding by the welding robots 49.

After the above, the moving stage 27 is again moved from the part setting station to the welding station. The moving stage 27 moves from the welding station to the part setting station, and positioning of the second small components 41, 43, 45, and 47, after which is moves again to the welding station, at which time the work held by the handling robot 55 is additionally regular welded by the welding robots 49, thereby completing the welding of the front floor panel 31 and the first small components 33, 35, 37, and 39. For this reason, the waiting state of the welding robots 49 is avoided, thereby enabling efficient welding.

It is possible to provide a fixed regular welding gun stand, and to move the workpiece W held by the handling robot 55 thereto, so as to perform the regular welding separately.

Figure 15:
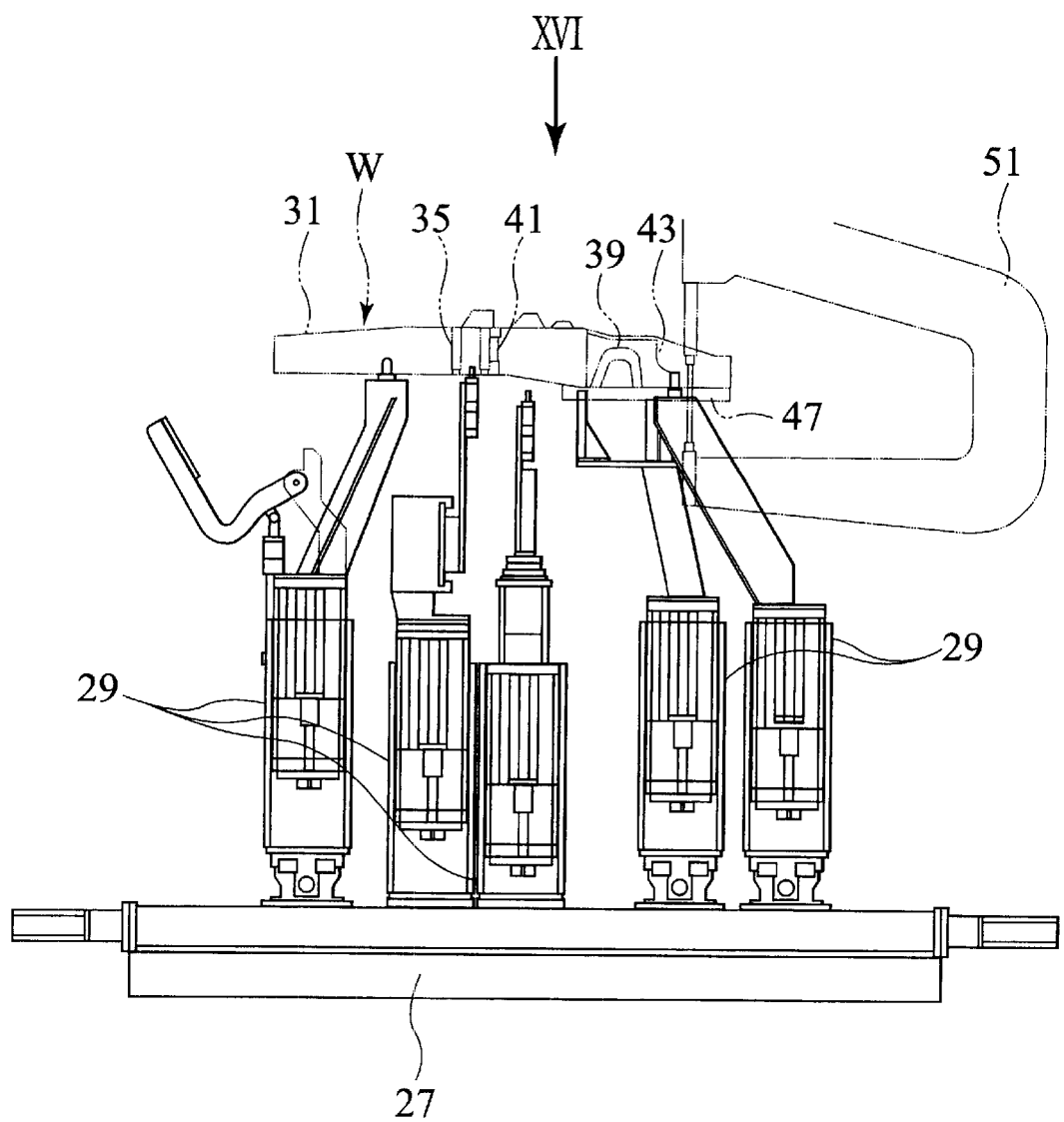
FIG. 15 is a front view of locator jigs of FIGS. 6 and 7 having the front floor panel and small components of FIG. 4 set thereto.
Figure 16:
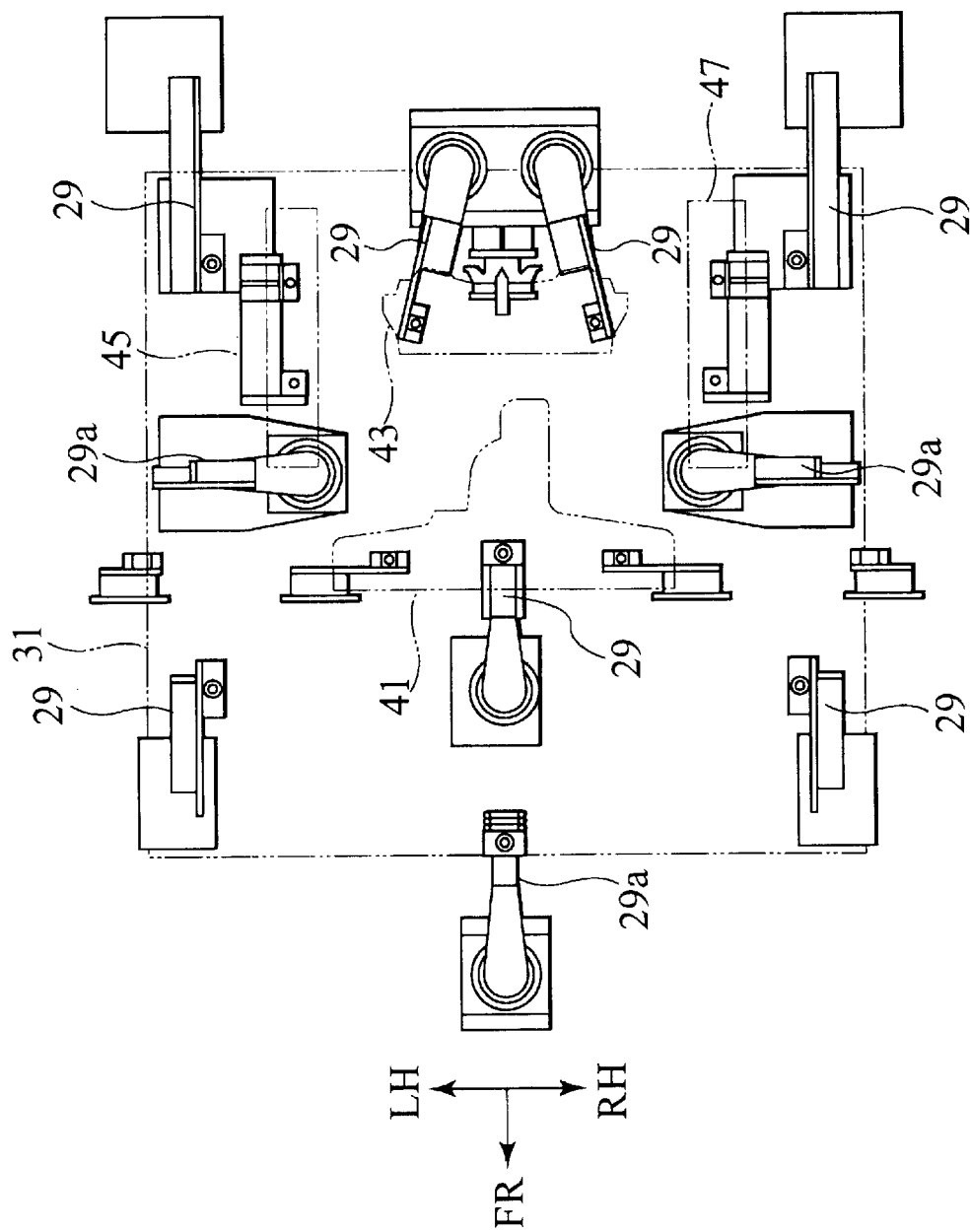
FIG. 16 is a view along arrow XVI of FIG. 15.

The handling robot 55 places the reversed front floor panel 31, to the upper surface of which are welding the first small components 33, 35, 37, and 39, onto the second small components 41, 43, 45, and 47 on the moving stage 27 moved to the welding station. This condition is shown in enlarged form in FIG. 15. FIG. 16 is a view along arrow XVI of FIG. 15. Positioning mechanisms 66 of corresponding locator jigs 29 position and hold the front floor panel 31.

At this time as well, depending upon the vehicle type, a surplus locator jig 29a that is not used in positioning exits. For example, as a locator jig 29 performing prevention of sagging of the workpiece W, there is a locator jig 29a supporting the lower surface of the vehicle body front side of the front floor panel 31 (left side in FIG. 16).

In FIG. 10, a locator jig 29 that positions a front seat mounting outer piece RH 37 and a front seat mounting outer piece LH 39 can become a surplus locator jig 29a, in which case the locator jigs 29 used are different from FIG. 10, or the method of using locator jigs 29 can be different, such as in the case in which a locator jig 29 moves along the guide rails 87 and 89 in FIG. 6 and FIG. 7 and has a different position.

In the condition in which the second small components 41, 43, 45, and 47 are positioned on the lower surface of the front floor panel 31, four welding robots 49 perform temporary welding so as to assemble the second small components 41, 43, 45, and 47 to the front floor panel 31.

When this temporary welding is completed, the positioning and holding of the workpiece W by the positioning mechanisms of the locator jigs 29 is released, and the grabbing mechanism of the handling robot 55, opposite the case described above, approaches the workpiece W from the top, with the clamping mechanism 93 facing downward in the condition of FIG. 8, so said to hold the workpiece W.

The moving stage 27 at which the workpiece W has been lifted up and removed from the locator jigs 29 returns to the part setting station from the welding station, so as to be ready to set the next workpiece W.

The welding robots 49 perform regular welding with respect to the workpiece W grabbed by the handling robot 55, thereby completing the welding of the front floor panel 31 and the second small components 41, 43, 45, and 47.

The above-noted regular welding can alternately be done separately by the above-noted fixed regular welding gun stand.

By the above, the workpiece W has the first small components 33, 35, 37, and 39 and the second small components 41, 43, 45, and 47 welded to the front and rear surfaces thereof, respectively.

The workpiece W after completion of welding is held by the handling robot as it is transferred to the workpiece placement stage 57. After having been transferred to the workpiece placement stage 57, the workpiece W is grabbed by the transfer robot 61, and is transferred to the stud bolt welder 63, at which the stud bolt is welded thereto. After that, the transfer robot 61 sets the workpiece W onto a prescribed position on the main assembly line B, the set workpiece W being welding to another workpiece by a welding robot (not shown in the drawing) disposed at the side of the main assembly line B, and a stud bolt is also used to fix the workpiece W to another workpiece.

According to the vehicle assembly apparatus described in detail above, because the locator jig 29 positioning and holding the workpiece W is a general-purpose jig, because it is possible to accommodate a change in vehicle type or a model change with merely a teaching operation, and it is not necessary to have a positioning jig for each vehicle type, there is not only a reduction in the facilities investment that must be made, but also a shortening of the time required for setup for a new vehicle type, thereby improving work efficiency.

Additionally, because only one moving stage 27 is required to transfer the workpiece W, compared to the case in which a plurality of stages are used, there is a reduction in the overall space required for the apparatus, a simplification of the apparatus, and a reduction in its cost.

In place of the locator jig 29, it is possible to provide a plurality of positioning jigs to accommodate vehicle types, with only the positioning fixture required being caused to protrude upward so as to support and hold the workpiece W, using a so-called vehicle jig slide. In place of the grabbing of the workpiece by the welding robots 49 and the reversal of the workpiece W by the handling robot 55, it is possible to provide a dedicated grabbing mechanism and reversal apparatus, respectively.

While the above-noted embodiment is described for the case in which small components are assembled to both the front and rear sides of a front floor panel 31, there are vehicle types in which small components are assembled to only the front surface. In this case, the work up until the time the handling robot 55 grabs and reverses the workpiece W, and the regular welding is done is the same as in the above-described embodiment, after which the workpiece W grabbed by the handling robot 55 can be transferred as is to the workpiece placement stage 57.

According to the embodiment described, a vehicle body assembly apparatus comprises a first mechanism (25, 27, 29, 29a) configured to selectively perform a first positioning in which a first set of small components (33, 35, 37, 39) to be mounted to (a front side as) one side of an arbitrary vehicle body part (W) of a plurality of kinds of vehicle body parts (VB) are positioned thereto, and a second positioning in which a second set of small components (41, 43, 45, 57) to be mounted to (a rear side as) another side of the arbitrary vehicle body part (W) are positioned thereto, and a second mechanism (49, 55) configured to selectively perform a first mounting in which the first set of small components (33, 35, 37, 39) are mounted to the arbitrary vehicle body part (W), and a second mounting in which the second set of small components (41, 43, 45, 57) are mounted to the arbitrary vehicle body part (W).

In this apparatus, the first mechanism selectively performs the first positioning and the second positioning, and the second mechanism performs the first mounting and the second mounting, permitting these four operations to be combined, so that the first positioning and the first mounting are performed on the one side of the vehicle body part and the second positioning and the second mounting are performed on the other side, to complete mounting of small components to the arbitrary vehicle body part.

As the first positioning and the second positioning are performed in a selective manner, the first mechanism can be simplified in comparison with a case in which these operations are performed together. Like effects may well be concluded of the second mechanism.

Moreover, the first mechanism is commonly used for the first positioning and the second positioning, and the second mechanism is commonly used for the first mounting and the second mounting, permitting an increased efficiency in use of the facilities.

In this regard, although in the embodiment the vehicle body part is reversed by the second mechanism to thereby enhance common use of the first and second mechanisms for the front and rear sides and simplification of a holding mechanism by use of the gravity, the first and second mechanisms may preferably have their associated portions adapted for their own rotation to achieve like effects.

It will be seen that the first mounting and the second mounting may be considered as operations up to provisional welding, so that the handling robot (55) which resets the reversed vehicle body part on jigs (29) can belong to the first mechanism.

Further, in the embodiment described, when repeating the above-noted four operations along a temporal axis, the first mounting and the second positioning can be partially overlapped on each other, and the second mounting and the first positioning cal also be partially overlapped, allowing for an even productivity to be kept even in comparison with a case in which the first positioning and the second positioning are concurrently performed and the first mounting and the second mounting are performed concurrently.

According to the present embodiment, in a vehicle body assembly method for welding small components onto a surface of a vehicle body part, a small component is positioned into a general-purpose jig on a moving stage at a part setting station, the vehicle body part being placed onto the set small component and positioned in another general-purpose jig, after which the moving jig is caused to move to a welding station and the vehicle body part and small component are welded together by a welder, after which the vehicle body part is turned over by a reverser, after which it is transferred to outside from the welding station.

Because the positioning jig that positions a vehicle body part provided on a moving stage and a small component is a general-purpose jig, it is not necessary to have a special dedicated holding jig to hold the small component, and the moving stage can be a single stage that shuttles between a part setting station and a welding station.

According to the embodiment, in a vehicle body assembly method for welding a small components onto the front and rear surfaces of a vehicle body part, a first small component to be assembled to a first surface of the vehicle body part is positioned into a general-purpose jig on a moving stage at a part setting station, the vehicle body part being placed onto the set small component positioned in another general-purpose jig, after which the moving stage is caused to move to a welding station and the vehicle body part and small component are welding together, after which the vehicle body part is turned over by a reverser and the moving stage is caused to retreat to the part setting station, a second small component being positioned into the general-purpose jig on the moving stage, after which this moving stage is again caused to move to the welding station, at which the turned-over vehicle body part is placed onto the second small component and positioned into another general-purpose jig on the moving stage, and the welder welds the vehicle body part and the small component together, after which they are transferred to outside from the welding station.

Because the positioning jigs that position a vehicle body part provided on a moving stage and a first and second small component are general-purpose jigs, it is not necessary to have a special dedicated holding jig to hold the first and second small components, and the moving stage can be a single stage that shuttles between a part setting station and a welding station.

In the embodiment, the welder is a welding robot, and after the vehicle body part is grabbed by a welding gun of the welding robot and the moving stage is caused to move away from the general-purpose jig, a reverser grabs and turns over the vehicle body part.

Because the vehicle body part is grabbed by the welding robot, it is not necessary to have a dedicated holder such as a robot to hold the workpiece, thereby enabling establishment of sufficient space for the welding operation, enhancing the ease of welding, and reducing the cost.

The welder performs regular welding with the vehicle body part grabbed by the reverser.

It therefore is possible for the welding robot to perform regular welding while the moving stage retreats and a small component is set onto the general-purpose jig thereof, thereby enabling efficient use of the welding robot, without having to make it wait.

The reverser is a handling robot that unloads a vehicle body part from the welding station to the outside.

It therefore is necessary to have neither a special reversing apparatus nor a reversing station, since the reverser serves also a handling robot that transfers the vehicle body part from the welding station to the outside, thereby reducing the cost.

When the workpiece, which is a vehicle body part or small component, is positioned, a surplus general-purpose jig not used in positioning is lowered to a position at which the workpiece is not positioned.

Accordingly, by supporting a position at which the workpiece is not positioned from the bottom using a surplus general-purpose jig, it is possible to avoid problems such as falling over of the workpiece, and deformation such as sagging of a planar part thereof, and to maintain the workpiece in the proper attitude, thereby enabling effective use of a general-purpose jig to required for positioning.

When the workpiece, which is a vehicle body part or small component, is positioned, a surplus general-purpose jig not used in positioning is used to prevent improper setting of the workpiece.

Accordingly, depending on whether or not a surplus general-purpose jig makes contact with a workpiece when it is set, it is possible to distinguish whether or not the workpiece is properly oriented using this general-purpose jig, thereby enabling effective use of the surplus general-purpose jig.

The a workpiece detector for detecting workpiece, which is a vehicle body part or small component, is provided on a general-purpose jig, and when the workpiece is positioned, the workpiece detector of a surplus general-purpose jig not used in positioning is used to detect the workpiece.

Accordingly, depending on whether the detector of a surplus general-purpose jig makes contact with the workpiece when the workpiece is set, it is possible to distinguish whether or not a workpiece has been set, or what type of vehicle the set workpiece is for, thereby making effective use of the surplus general-purpose jig.

Further, according to the embodiment, there is provided a vehicle body assembly apparatus having a moving stage that can move between a part setting station and a welding station, a plurality of general-purpose jigs provided on the moving stage which position the vehicle body parts and the small components at the part setting station, a welder for welding together the vehicle body part and small component positioned on the general-purpose jig at the welding station, and a reverse for grabbing and turning over the vehicle body part after welding.

A small component to be assembled to a surface of a vehicle body part is positioned in a general-purpose jig on a moving stage at a part setting station and the vehicle body part is placed on the set small component and positioned in a general purpose jig on the moving stage, thereby eliminating the need for a special holding jig for the small component and reducing the cost and, because there is no need to exchange the holding jig, the time for accommodating a change of vehicle type is shortened and work efficiency is improved. In this condition, the moving stage is caused to move to the welding station, and the welder welds together the vehicle body part and the small component.

After welding, the reverser turns over the vehicle body part and transfers it to outside of the welding station, and causes the moving stage to retreat to the part setting station, so as to be ready to set the next small component. In this embodiment, because it is necessary to have only one moving stage shuttling between the part setting station and the welding station, it is possible to reduce the overall installation space for the apparatus, to simplify the structure thereof, and to reduce the cost thereof.

In the case of assembling small components to the rear surfaces of the vehicle body part, another small component, to be assembled to the rear surface is positioned in a general-purpose jig on the moving stage, after which the moving stage is again caused to move to the welding station, at which the reversed vehicle body part is placed on this other small component and positioned in the general-purpose jig on the moving stage, a welding robot then welding together the vehicle body part and the small component.

The contents of Japanese Patent Application No. 11-224097 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A vehicle body assembly apparatus comprising:
a first mechanism configured to selectively perform a first positioning in which a first set of small components to be mounted to one side of an arbitrary vehicle body part of a plurality of kinds of vehicle body parts are positioned thereto, and
a second positioning in which a second set of small components to be mounted to another side of the arbitrary vehicle body part are positioned thereto; and
a second mechanism configured to selectively perform a first mounting in which the first set of small components are mounted to the arbitrary vehicle body part, and
a second mounting in which the second set of small components are mounted to the arbitrary vehicle body part, and wherein one of the first and second mechanisms makes a reversing of the arbitrary vehicle body part between the first mounting and the second mounting.

2. A vehicle body assembly apparatus according to claim 1, wherein the second mechanism is configured to perform the first mounting to be achieved by a first welding in which the first set of small components in the first positioning are welded to the arbitrary vehicle body part, the reversing, and the second mounting to be achieved by a second welding in which the second set of small components in the second positioning are welded to the arbitrary vehicle body part.

3. A vehicle body assembly apparatus according to claim 2, wherein
the first mechanism comprises a union of
a first set of jigs configured to hold the arbitrary vehicle body part from the one side and to perform the first positioning, and
a second set of jigs configured to hold the arbitrary vehicle body part from the other side and to perform the second positioning, and
the second mechanism comprises a combination of a plurality of welding robots and a handling robot configured to cooperatively perform the first welding, the reversing, and the second welding.

4. A vehicle body assembly apparatus according to claim 1, wherein the second mechanism is configured to perform the first mounting to be achieved by a first welding in which the first set of small components in the first positioning are provisionally welded to the arbitrary vehicle body part,
the first mechanism is configured to perform the reversing, and the second mechanism is further configured to perform the second mounting to be achieved by a second welding in which the second set of small components in the second positioning are provisionally welded to the arbitrary vehicle body part,
the first mechanism is configured to perform the reversing, and
the second mechanism is further configured to perform the second mounting to be achieved by a second welding in which the second set of small components in the second positioning are provisionally welded to the arbitrary vehicle body part.

5. A vehicle body assembly apparatus according to claim 4, wherein
the first mechanism comprises
a union of a first set of jigs configured to hold the arbitrary vehicle body part from the one side and to perform the first positioning, and a second set of jigs configured to hold the arbitrary vehicle body part from the other side and to perform the second positioning, and
a handling robot configured to reverse the arbitrary vehicle body part and to place the reversed vehicle body part on the second set of jigs, and
the second mechanism comprises a plurality of welding robots configured to perform the first welding, and the second welding.

6. A vehicle body assembly apparatus according to claim 1, further comprising a third mechanism configured to perform a reversing of the arbitrary vehicle body part between the first mounting and the second mounting.

7. A vehicle body assembly apparatus according to claim 6, wherein the first mechanism comprises a union of a first set of jigs configured to hold the arbitrary vehicle body part from the one side and to perform the first positioning, and a second set of jigs configured to hold the arbitrary vehicle body part from the other side and to perform the second positioning, the second mechanism comprises a plurality of welding robots configured to the first mounting to be achieved by a first welding in which the first set of small components in the first positioning are provisionally welded to the arbitrary vehicle body part, and the second mounting to be achieved by a second welding in which the second set of small components in the second positioning are provisionally welded to the arbitrary vehicle body part, and the third mechanism comprises a handling robot configured to perform the reversing of the arbitrary vehicle body part.

8. A vehicle body assembly apparatus according to claim 1, wherein the first mechanism comprises a union of a first set of jigs configured to hold the arbitrary vehicle body part from the one side in a first station and to perform the first positioning, and a second set of jigs configured to hold the arbitrary vehicle body part from the other side in a second station spaced from the first station and to perform the second positioning, and a transporter configured to transport the union of the first and second set of jigs between the first and second stations, and the second mechanism comprises a combination of a plurality of welding robots and a handling robot configured to perform in the second station the first mounting to be achieved by a welding in which the first set of small components in the first positioning are welded to the arbitrary vehicle body part, a reversing of the arbitrary vehicle body part subjected to the first mounting, and the second mounting to be achieved by a welding in which the second set of small components in the second positioning are welded to the arbitrary vehicle body part.

9. A vehicle body assembly apparatus according to claim 8, wherein a jig of a complementary set of the union of the first and second sets of jigs is configured to perform one of a supporting and a detection of the arbitrary vehicle body part.

10. A vehicle body assembly apparatus comprising:

first means for selectively performing a first positioning in which a first set of small components to be mounted to one side of an arbitrary vehicle body part of a plurality of kinds of vehicle body parts are positioned thereto, and a second positioning in which a second set of small components to be mounted to another side of the arbitrary vehicle body part are positioned thereto; and second means for selectively performing a first mounting in which the first set of small components are mounted to the arbitrary vehicle body part, and a second mounting in which the second set of small components are mounted to the arbitrary vehicle body part, and wherein one of the first and second mechanisms makes a reversing of the arbitrary vehicle body part between the first mounting and the second mounting.

11. A vehicle body assembly apparatus for welding a small component of a vehicle body part, comprising:

a moving stage that can move between a part setting station and a welding station;

a plurality of general-purpose jigs provided on the moving stage which position the vehicle body part and the small component at the part setting station;

a welder for welding together the vehicle body part and small component positioned on the general-purpose jig at the welding; and a reverse for grabbing and turning over the vehicle body part after welding.

* * * * *